United States Patent [19]

Kobayashi et al.

[11] Patent Number: 4,818,999

[45] Date of Patent: Apr. 4, 1989

[54] METHOD AND APPARATUS FOR MEASURING FREQUENCY AND PHASE DIFFERENCE

[75] Inventors: Herbert S. Kobayashi, Webster; Christopher L. Lichtenberg, Houston; Paul W. Shores, Houston; Allen R. Cunningham, Houston, all of Tex.

[73] Assignee: The United States of America as represented by the Administrator of The National Aeronautics and Space Administration, Washington, D.C.

[21] Appl. No.: 924,472

[22] Filed: Oct. 29, 1986

[51] Int. Cl.[4] ............................................. G01S 13/93
[52] U.S. Cl. ...................................... 342/59; 342/70; 342/113; 307/516; 328/134
[58] Field of Search .................... 342/59, 70, 104, 113, 342/115; 307/514, 516, 525, 526, 527; 328/133, 134; 324/79 D, 83 D

[56] References Cited

U.S. PATENT DOCUMENTS

| | | | |
|---|---|---|---|
| 3,058,063 | 10/1962 | Sher | 324/79 D |
| 3,327,307 | 6/1967 | Miles | 324/83 D X |
| 3,588,710 | 6/1971 | Masters | 328/133 |
| 3,634,771 | 1/1972 | Hermel | 328/133 |
| 3,646,455 | 2/1972 | Coccagna | 328/133 |
| 4,020,422 | 4/1977 | Underhill | 328/133 |
| 4,148,028 | 4/1979 | Fujiki | 342/70 |
| 4,151,473 | 4/1979 | Coleman et al. | 307/516 X |
| 4,333,055 | 6/1982 | Crackel | 328/133 |
| 4,354,124 | 10/1982 | Shima et al. | 307/522 |
| 4,378,509 | 3/1983 | Hatchett et al. | 307/528 |

Primary Examiner—T. H. Tubbesing
Attorney, Agent, or Firm—Hardie R. Barr; John R. Manning; Edward K. Fein

[57] ABSTRACT

A system for deriving direct digital indications of frequency and phase difference between two incoming pulse trains adaptable for collision avoidance systems or the like.

A pair of radar beams 152 and 152A are directed toward a target 153 and corresponding beams 154 and 154A returning therefrom are detected. A digital difference circuit 110 forms a pulse train 66 from the Doppler shift frequencies of each beam pair having a repetition rate functionally related to the difference in magnitude of the shift frequencies. Pulses from the pulse train are counted as a function of time. Visual indications thereof on display 144 are correlative to target position relative to beams 152 and 152A.

10 Claims, 3 Drawing Sheets

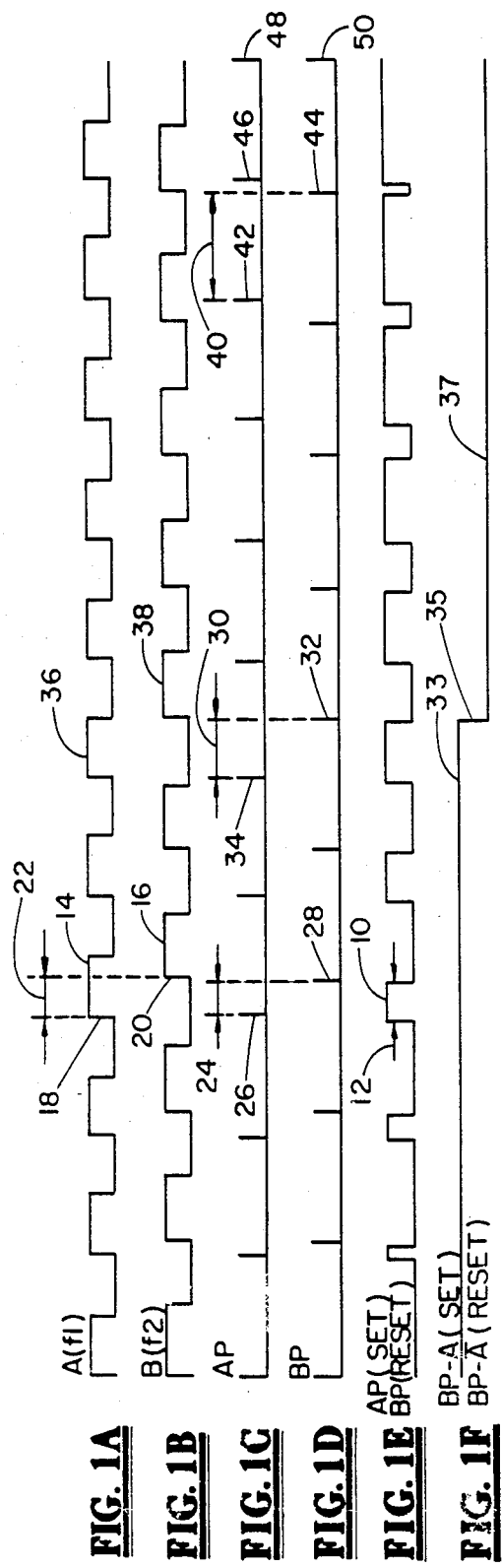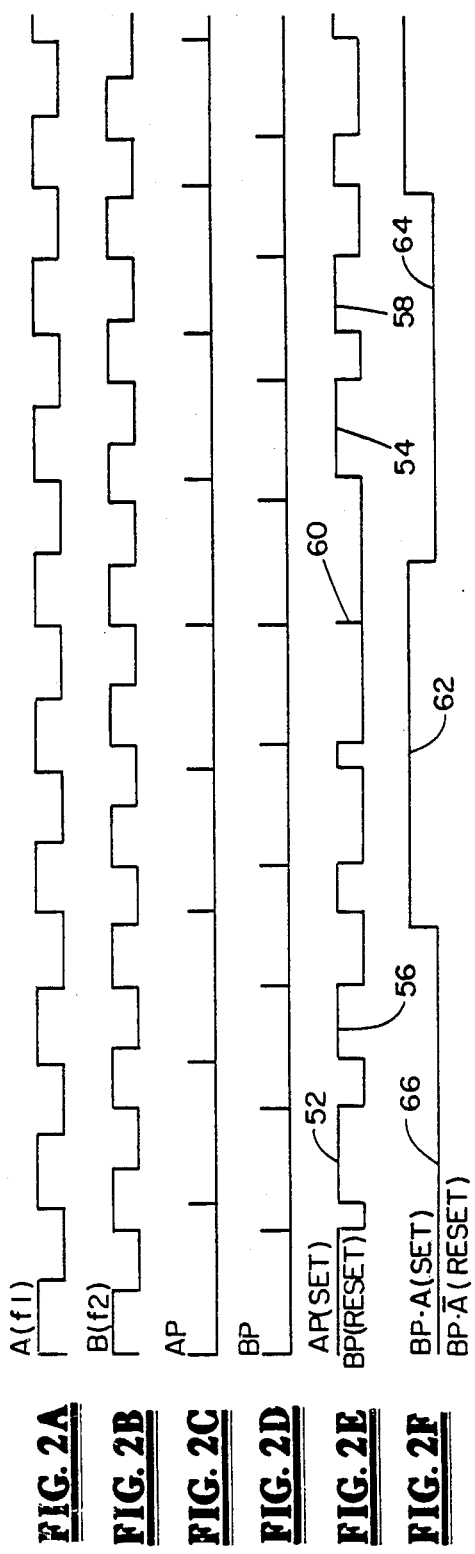

METHOD AND APPARATUS FOR MEASURING FREQUENCY AND PHASE DIFFERENCE

ORIGIN OF THE INVENTION

The invention described herein was made by employees of the U.S. Government and may be manufactured and used by or for the Government for governmental purposes without payment of royalties thereon or therefor.

TECHNICAL FIELD

This invention relates to frequency/phase difference processors, and, more particularly, relates to dual nonsynchronous frequency and/or phase difference measuring systems and methods.

BACKGROUND OF INVENTION

The need has often arisen in phase locked loops, radar systems such as fast geometric tracking radars, vehicular collision avoidance systems and other such systems seeking, tracking, or measuring velocity of targets, missiles, or projectiles and the like, for deriving indications of the difference in frequency and/or phase between two incoming signals.

Several analog and digital techniques are known in the art for achieving this objective, however they each suffer from a variety of deficiencies. For example, the analog nature of the inputs and outputs of analog frequency and phase discriminators is not particularly convenient for use in digital systems.

This has given rise to various digital implementations using combinations of discrete integrated circuit packages and has even resulted in manufacturers making available self-contained digital frequency and phase detectors in single packages whereby incoming digital pulse trains of unknown frequency or phase may be accepted for processing. However, even with respect to such discrete integrated circuit approaches to frequency and phase detector components, the outputs thereof typically are not easily converted to a conveniently usable digital form.

Moreover, with respect to both prior analog and digital systems, difficulties are further experienced in obtaining frequency or phase difference output indications as well as the tracking by such outputs of one of the input frequencies when decreased from a frequency greater than that of the reference frequency toward the reference frequency.

With respect to the aforementioned prior radar systems, several other problems have been associated therewith. They frequently include a scanning means which typically has a mechanical scanning drive motor associated with a single radar for beam scanning the target. Measurements of the target position are thus derived from processing the scan angle data.

Thus, these systems, particularly those employing mechanical scanning, typically have problems associated with developing scan and scan angle data processing mechanisms which respond rapidly and accurately to fast moving targets while nevertheless being of reasonable cost. This latter factor alone is critical, for example, in providing a collision avoidance system appropriate for the mass consumer automobile market.

Moreover, the expense, response, and accuracy problems become exacerbated when it is necessary to provide a system for detecting vertical as well as horizontal position or motion, requiring yet additional scan and processing mechanisms for the vertical plane. Still further, prior scanning systems have encountered difficulties when employed with large targets or at close ranges (such as those practical for collision avoidance systems) due to the inordinately large scan angles associated therewith.

Accordingly, in summary, a radar system was sought having improved features relative to accuracy, response time, expense, and applicability to close range targets which might otherwise require relatively large scan angles.

More particularly, an improved system was also highly sought after for precisely and quickly providing indications of frequency and/or phase differences between two incoming signals. Methods and apparatus were desirable which provided such indications virtually in real time and in inherently digital form, whereby the pulse rate of the digital output was functionally related to the frequency or phase difference between the two incoming input signals. Such methods and apparatus were further sought which could operate when incoming signals exceeded and approached the reference frequency normally associated with and provided in such frequency/phase difference processing systems.

The disadvantages of the prior art are overcome by the present invention which will be described with reference to the accompanying drawings.

DISCLOSURE OF THE INVENTION

A method and apparatus for deriving direct digital indications of frequency and phase difference between two incoming pulse trains.

First and second incoming pulse trains A and B having corresponding frequencies $f_1$ and $f_2$, respectively, define a varying frequency or phase difference which is desired to be determined. Leading edges of the pulses of the second pulse train are detected and a third pulse train generated therefrom, each pulse thereof corresponding to the leading edge of a different one of the pulses of pulse train B.

The simultaneous occurrence of each pulse from the third pulse train with a pulse from the first pulse train A is detected and employed to set a bistable memory element such as a latch or flip flop. In like manner, simultaneous occurrence of each pulse from the third pulse train with the low state or portion of the duty cycle of a pulse from the first pulse train is detected and employed to reset the memory element.

When the frequency of the first pulse train is greater than that of the second pulse train and the respective pulses are less than 180 degrees out of phase, the latch output will remain in a high state until the first time pulses from the two pulse trains become 180 degrees out of phase. Upon occurrence of this 180 degree phase shift, the latch output is forced low or reset, inasmuch as the pulses of the third pulse train occurring with absence of the first pulse train pulses will be detected.

The latch output will thus remain in a low state until a sufficient number of pulses in the first and second pulse trains have occurred for them to once again recur back in phase, whereupon this simultaneous recurrence of the pulses from the first and third pulse trains will once again be detected, resetting the latch again.

The latch output will accordingly comprise one output pulse for each time the cumulative phase shift or difference between the first and second pulse trains resulting from sufficient successive pulses totals 360 degrees or one cycle. The latch output pulse will remain high while the phase difference between the first and second pulse trains is within a first 180 degree phase shift range and will remain low while the cumulative phase difference between the trains is passing through the remaining 180 degree phase shift range. Occurrence of these latch output pulses are then measured or counted per unit of time resulting in the desired measurement of the frequency difference between the two incoming first and second pulse trains.

When the frequency $f_1$ of the first pulse train is less than $f_2$ (that of the second pulse train), operation of the system is similar. So long as pulses of the third pulse train (corresponding to the leading edge of the second pulse train) are coincident with pulses of the first pulse train, the latch will set and remain set. When pulses of the third pulse train finally become non-coincident with those of the first pulse train (due, again to cumulative phase shift of 180 from successive cycles of the first and second pulse trains), the latch will reset. Moreover, the latch will again remain active low until coincidence once again of the pulses of the second and third pulse trains due to cumulative phase shift therebetween. Thus, a latch output pulse again occurs for every one cycle of frequency difference between $f_1$ and $f_2$ of the first and second pulse trains, which may then be counted in time for the desired frequency or phase measurement.

In a preferred embodiment, the latch, leading edge pulse detector/generator, logic for detecting coincidence and non-coincidence, respectively, between the first and third pulse trains, and logic for generating latch set and reset pulses upon such coincidence and non-coincidence, respectively, are implemented by a discrete integrated circuit package or packages.

A relatively simple and inexpensive system is thereby provided with convenient digitally compatible input and output whereby direct digital indications of frequency and phase difference between two incoming signals is readily and reliably provided virtually in real time.

BRIEF DESCRIPTION OF THE DRAWINGS

The details of the invention will be described in connection with the accompanying drawings, in which:

FIGS. 1A-1F are timing diagrams indicating the relative timing between various signals of the present invention, wherein the frequency $f_1$ of the incoming first pulse train A is greater than the frequency $f_1$ of the incoming second pulse train B.

FIGS. 2A-2F are also timing diagrams indicating the relative timing between various signals of the present invention, wherein the frequency $f_1$ is less than that of $f_2$.

BEST MODE FOR CARRYING OUT THE INVENTION

Figure 3:
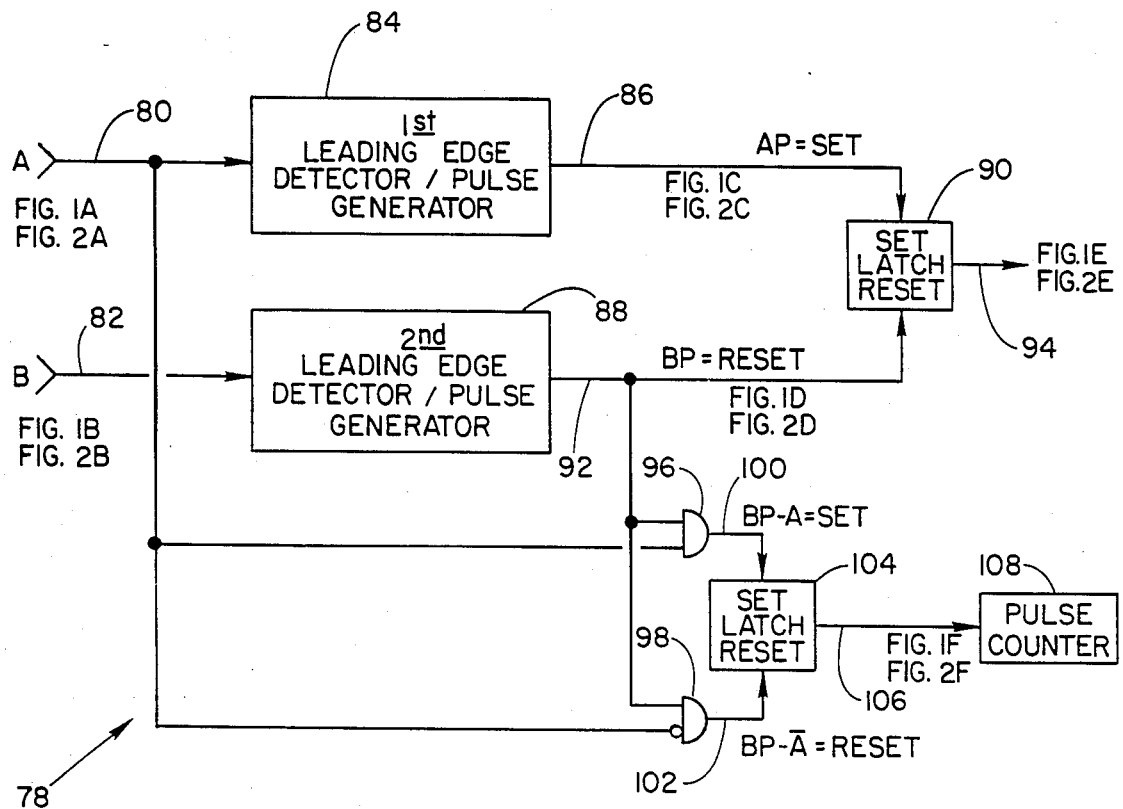
FIG. 3 is a schematic block diagram of a first embodiment of a frequency/phase differencing processor according to the invention.

Referring to FIGS. 1A-1F there will be seen depicted therein a timing diagram helpful in understanding the operation of the methods and apparatus of the present invention. First, the relative timing of signals present in embodiments of the present invention will be described with reference to the timing diagrams of FIGS. 1A-1F and 2A-2F. This will be followed by a description of embodiments generating signals in accordance with the thus-described timing diagrams.

With more particular reference to FIGS. 1A-1F, there will be seen depicted a first and second pulse train shown in FIGS. 1A and 1B, respectively. Each pulse train will have a characteristic respective frequency $f_1$ and $f_2$, and is comprised of a series of pulses having duty cycles as desired. A comparison of the figures will indicate that in the situation being described, $f_1$ is greater than $f_2$, although the reverse situation will be hereinafter described with respect to FIG. 2.

A comparison of FIGS. 1C and 1A will reveal that FIG. 1C depicts a pulse train wherein the pulses thereof occur at the leading edge of the pulses depicted in FIG. 1A. In like manner, a comparison of FIG. 1D with that of FIG. 1B indicates that a fourth pulse train shown in FIG. 1D may be comprised of a series of pulses generated with the leading edge of the pulses of the second pulse train of FIG. 1B. Hereinafter, for convenience the first and second pulse trains may be referred to as A and B, respectively, and the leading edge pulse trains of FIGS. 1C and 1D may be referred to as AP and BP, respectively.

An additional pulse train is depicted in FIG. 1E. A comparison of the pulses thereof with AP and BP (the leading edge pulse trains of FIGS. 1C and 1D) will indicate that each pulse of the FIG. 1E train commences coincident with the leading edge pulses occurring in FIG. 1C (AP). In like manner, each of the pulses in the FIG. 1E train terminates in duration coincident with occurrence of the leading pulses of the pulse train of FIG. 1D (BP). Accordingly, the width of each pulse in the train of FIG. 1E will vary in functional relation to the phase difference between the pulses of the pulse trains A and B of FIGS. 1A and 1B, respectively.

For example, with respect to the pulse 10 in the pulse train of FIG. 1E, it will be seen to have a width 12. Referring briefly to pulse trains A and B, pulses 14 and 16 will be seen therein, respectively. The leading edges 18 and 20 of these pulses 14 and 16, respectively, will define a phase difference 22 equal to the width 12 of the pulse 10. From a comparison of other pulses in the pulse train of FIG. 1E with corresponding pulses from A and B, it will thus become apparent that the width of each pulse of the pulse train of FIG. 1E corresponds to phase difference between two corresponding pulses of the pulse trains A and B of FIGS. 1A and 1B. As more particularly described hereinafter, the pulse train of FIG. 1E may be implemented by setting a latch or other memory element by the pulse train AP of FIG. 1C and resetting the latch with the pulse train BP of FIG. 1D.

Due to the frequency and thus phase difference between the pulse trains A and B (such as the phase difference 22 depicted in FIG. 1A), as successive pulses in A and B occur this difference will accumulate and thus increase. This may be seen by comparison of successive pulses in the pulse train of FIG. 1E wherein the pulses become wider as this phase difference increases due to the difference in time or phase shift 24 between successive pulses 26 and 28 of the pulses in trains AP and BP, respectively. As with the width of pulses in FIG. 1E, the phase or time difference separating two successive pulses such as pulse 26 and 28 in AP and BP will increase with successive occurrences of additional pulses in the pulse trains A and B. This may be seen as phase shift or time difference 30 in a comparison of pulse 34 of AP and pulse 32 of BP.

These pulses 32 and 34 are useful to illustrate another characteristic of the various pulses depicted in FIGS. 1A–1F. As this cumulative phase difference caused by the difference in $f_1$ and $f_2$ increases, eventually pulses from A and B such as pulses 36 and 38, respectively, will become 180 degrees out of phase. Additional phase difference continues to accumulate thereafter, as shown by phase difference 40 (FIGS. 1C and 1D) between pulses 42 and 44 of AP and BP, respectively. The later occuring pulses, such as pulse 44 of BP, will occur in time increasingly closer to pulse 46 of AP until finally there is coincidence in time between the pulses of AP and BP, as shown, for example, by pulses 48 and 50 of AP and BP, respectively.

Several important characteristics of the wavetrains depicted in FIGS. 1A–1F may thus be summarized. First, two input pulse trains A and B may be provided of different frequencies. Thus, with respect to successive pairs of pulses from A and B, increasingly larger cumulative phase differences therebetween will be exhibited. A pulse train (FIG. 1E) may be created wherein pulses therein commence with detection of the leading edge of pulses in the train A (pulses AP in FIG. 1C). These pulses may be terminated by pulses corresponding to the leading edge of the pulses of pulse train B (pulses BP in FIG. 1D). Moreover, the width of these pulses thereby created from detection of leading edges of the pulses in A and B will increase in time, i.e. their duty cycle will increase with this increasing accumulation of phase difference between the pulses of A and B. At the point where the phase difference between the pulses of A and B is 180 degrees, as shown by pulses 36 and 38, the duty cycle of the pulses shown in FIG. 1E will be 50%.

Upon occurrence of further pulses in A and B, this duty cycle of the pulse train of FIG. 1E will further increase to 100% upon coincidence of pulses in A and B, such as pulses 48 and 50. In this manner, the phase difference between the pulses of A and B will have passed through a full 360 degree phase shift or one cycle. It will thus be appreciated that upon each such accumulation of 360 degrees phase difference between the pulses of A and B, the pattern of the pulse train of FIG. 1E will repeat. The pulses thereof will start over at a relatively narrow width and successively increase in width with increased cumulative phase difference between the pulses of A and B. It is significant to note that at any given time, the width of the pulses in the train of FIG. 1E may be used as an indication of the phase difference between corresponding pulses in the pulse trains A and B.

Finally, with respect to FIG. 1F, it is necessary to compare the pulse train BP of FIG. 1D with pulse train A of FIG. 1A. This comparison will indicate that the high state 33 portion of the waveform of FIG. 1F occurs only upon simultaneous occurence of pulses BP with pulses in A. Upon sufficient 180 degree phase shift hereinbefore noted, the waveform of FIG. 1F will reflect a transition 35 to a low state 37. More particularly, the pulses BP of FIG. 1D are no longer occuring simultaneously with the pulses A. Low state 37 portion of the waveform of FIG. 1F will reflect this. This may be seen by noting that the transition 35 occurs when the pulse 32 of BP is not coincident with the pulse 36 of A, but rather occurs during the low state of pulses of A.

With respect to the waveform of FIG. 1F, it will exhibit a high state during the presence of pulses BP (i.e. the leading edge of B) coincident with the high state of pulses of A. Conversely, the waveform 1F will remain low so long as all the pulses BP are non-coincident with the pulses A. The former situation may be represented with respect to Boolean algebra as BP·A, whereas the non-coincidence of pulses BP and A may be represented by the expression BP·$\overline{A}$.

In digital terms, such representations may be commonly thought of as the "anding" of the pulse trains BP and A (with respect to BP·$\overline{A}$), and the "anding" of BP with the complement of A (with respect to BP·$\overline{A}$), such "anding" being effected conventionally as hereinafter described with logic gates.

Returning to the significance of the waveform of FIG. 1F, its high state 33 reflects coincidence of the leading edge of the pulses of B with the high state of the pulses of A and the low state 37 of the waveform of FIG. 1F reflects non-coincidence thereof. The high state 33 of pulses of FIG. 1F will thus occur while the pulses of A and B are within one 180 degree phase shift range. Similarly, the low state 37 of the waveform of FIG. 1F will indicate when the relationship between two successive pulses of the wavetrains A and B are in a second 180 phase shift range. More importantly, however, a pulse as shown in FIG. 1F will thus occur each time the total cumulative phase shift between the pulses of A and B passes through a full 360 degrees of one cycle of frequency difference. Accordingly, as will hereinafter be described in further detail, by counting with respect to time the occurrence of such pulses 33 of FIG. 1F, a direct indication of frequency or phase difference between A and B (i.e. $f_1 - f_2$) will be obtained.

The waveforms of FIGS. 2A–2F depict typical waveforms with the present invention wherein the first incoming pulse train A has a frequency $f_1$ less than that of $f_2$, the frequency of B, (i.e. the opposite situation from that depicted in FIGS. 1A—1A). Thus in FIG. 2A the frequency of the first pulse train A is less than that of the second pulse train B shown in FIG. 2B. In like manner to corresponding FIGS. 1C and 1D, the pulses of FIGS. 2C and 2D correspond with the leading edges of the pulses of FIGS. 2A and 2B, respectively. Also, similar to the waveform of FIG. 1E, in FIG. 2E a series of pulses are shown, each of which begins at the leading edge of the pulses of A (and may accordingly be triggered by the pulse train AP of FIG. 2C) and terminates with the leading edge of the pulses of B of FIG. 2B. These terminations in like manner may be effected by employing the pulse train BP of the waveform of FIG. 2D.

A comparison of the waveforms of FIGS. 1E and 2E will indicate similarities. First, once again, width of the pulses of FIG. 2E are directly functionally related to the phase difference between the corresponding pair of pulses in A and B. However, unlike the waveform of FIG. 1E wherein the pulse widths gradually increase indicating cumulative increase in phase difference between pairs of pulses in A and B, the pulses of the waveform of FIG. 2E gradually decrease in width. Second, similar to FIG. 1E, the waveform of FIG. 2E repeats its pattern upon A and B passing through a full 360 phase shift resulting from cumulative phase differences between A and B. Thus, pulse pairs 52–54 and 56–58 will appear to be of similar width, for example, the pattern repeating at pulse 60 wherein leading edges of pulses of A and B are once again coincident.

Yet a further similarity may be seen in a comparison of FIGS. 1F and 2F, both of which indicate a high state upon coincidence of the leading edge of the pulse train B (i.e. BP) with a high state of pulses in the wavetrain of A. It will be recalled that this may be represented by BP·A and this portion of the waveform of FIG. 2E may be seen depicted therein with reference to numeral 62. Similarly, a low state of the waveform of FIG. 2F such as portions 64 and 66 may be seen to occur upon non-coincidence of pulses BP with the high state of the pulses of A (this situation being expressed hereinbefore as BP·$\overline{A}$). Thus, similar to the waveform of FIG. 1F, in the case of the waveform of FIG. 2F a pulse occurs even when $f_2$ is greater than $f_1$, so long as the cumulative phase difference between the pulses of A and B passes through 360 degrees or one cycle of frequency difference. Accordingly, in like manner to the situation of FIG. 1F, if these pulses 62 of FIG. 2F are counted in time, once again an indication of the desired frequency or phase difference between A and B may be achieved.

With the foregoing temporal relationships between the various waveforms of FIGS. 1A–1F and 2A–2F having been described in general terms, it may now be appreciated how various forms of electronic circuits may be provided for realizing embodiments of these waveforms. With reference to FIG. 3, a functional schematic block diagram may be seen depicted therein showing how the waveforms of FIGS. 1A–1F and 2A–2F may be created with a frequency/phase differencing detector system 78 of the present invention. First, two incoming pulse trains A and B shown by reference numerals 80 and 82 are made available to system 78. The pulse trains are preferably in the form of conventional digital electronic pulse waveforms such as those of FIGS. 1A and 2A, and FIGS. 1B and 2B, respectively.

These pulse trains may correspond to Doppler signals from a radar system such as that hereinafter described for purposes of implementing a crash avoidance system for automobiles or the like, the invention is not intended to be so limited. Accordingly, in a more general form, the waveforms A and B may be comprised of any incoming signals wherein it is desirable to provide a measurement of the difference in frequency or phase therebetween.

Still referring to FIG. 3, the signal A may be introduced into a first leading edge detector/pulse generator 84 which will generate an output 86 which is the familiar leading edge pulse train AP of FIGS. 1C and 2C. In like manner, the second leading edge detector/pulse generator 88 may be provided which in response to incoming pulse train 82 will generate an output 92 which is the familiar pulse train BP depicted in FIGS. 1D and 2D. With respect to the detector/pulse generators 84 and 88, they may be implemented in a number of manners well known in the art. As but one example, several discrete integrated circuit packages are provided by various manufacturers in the form of edge triggered one-shot multivibrators which have been found to work quite satisfactorily. With respect to such components, in response to the leading edge of each pulse such as those of A and B, a single pulse will be correspondingly generated and placed upon their respective outputs 86 and 92. The width of the one-shot pulses may be controlled as desired by discrete resistor-capacitor networks attached thereto. This results in pulses such as those depicted in FIGS. 1C, 2C, 1D, and 2D which are coincident with a positive going transition of a respective pulse in wavetrain A or B which is the input to the particular detector/generator 84 or 88.

Still referring to FIG. 3, a latch 90 may preferably be provided having a set and reset terminal. The latch 90 may more generically be considered as a memory device. In response to occurence of a first signal its output will be set in a first state and in response to a occurence of a second input, the output may be set in a different output state or voltage level. Thus, the latch 90 may preferably take the form of one of many discrete integrated circuit packages such as a D flip flop, latch, or other memory device whose output will change in functional relation to the two input signals as just described. In particular, with respect to the embodiment of FIG. 3, it will be seen that the latch 90 may preferably have delivered to its set input the output 86 of the detector/generator 84. Similarly the output 92 of the second detector/generator 88 may be delivered to the reset input of the latch 90.

In a particularly convenient embodiment wherein the latch 90 is in the form of a D flip flop, once a set pulse is delivered on the set input 86, the output 94 will set in a high state and remain so notwithstanding subsequent additional pulses on the set input 86 until a reset pulse is received by the latch. This high output state of the latch output 94 may be seen to correspond to occurence of pulses in FIGS. 1E and 2E, with termination of the pulses being seen to coincide with occurence of reset pulses BP of FIGS. 1D and 2D. Thus, the output pulses 94 from the latch 90, corresponding to these waveforms of FIGS. 1E and 2E, will be seen to have the characteristic that their widths correspond to the instantaneous phase difference between two corresponding pulses comprising the pulse trains A and B. As hereinbefore noted these pulses 94 may be employed as an instantaneous measurement of such phase differences as desired. Conventional means well known in the art may be used to detect the magnitude of duty cycles on output 94.

Still with reference to FIG. 3, in implementing the waveforms of FIGS. 1A–1F and 2A–2F, a logical AND block 96 may be provided. AND block 96 will have as its inputs pulse train BP corresponding to output 92 of the second detector/generator 88 and a further input A corresponding to the incoming pulse train 80 referred to as A of FIGS. 1A and 2A. Similarly, a logical AND gate 98 may be provided also having as its inputs the BP pulse train 92 and the A pulse train A. With repsect to the latter, it will be noted that the gate 98 will be provided with an inverting input whereby actually the complement of A or $\overline{A}$ is provided. Due to the logical "anding" function of the gates 96 and 98, their outputs 100 and 102, respectively, will result in the anding of their inputs. More particularly, the output 100 of gate 96 will logically be of the familiar form BP·A, whereas the output 102 of gate 98 will be of the form BP·$\overline{A}$, due to the inverting of one of its inputs.

In like manner to the provision for latch 90, a latch 104 will be provided having delivered to its set input the BP·A output 100 of gate 96. Also, the reset input of the latch 104 will have delivered thereto the BP·$\overline{A}$ output 102 of the gate 98. Also similar to latch 90, the occurence of a signal 100 (BP·A) at the set input of latch 104 will cause the latch 104 to generate an output 106 of a logical high state. Similarly, occurence of a signal 102 (BP·$\overline{A}$) at the reset terminal of the latch 104 will cause a resetting of the output 106 of the latch 104 to a low value. Accordingly, the output 106 of latch 104 may be recognized as the waveform of FIGS. 1F and 2F wherein a pulse such as pulse 33 (with respect to FIG. 1F) or pulse 62 (with respect to FIG. 2F) will occur upon passage each cumulative 360 degrees of phase difference or one cycle difference in frequency between A and B.

By delivering this output 106 to an appropriate pulse counter 108 whereby these pulses on the output 106 are counted per unit of time, a direct digital indication is thereby provided of the frequency or phase difference between the two incoming pulse trains A and B as desired.

Figure 4:
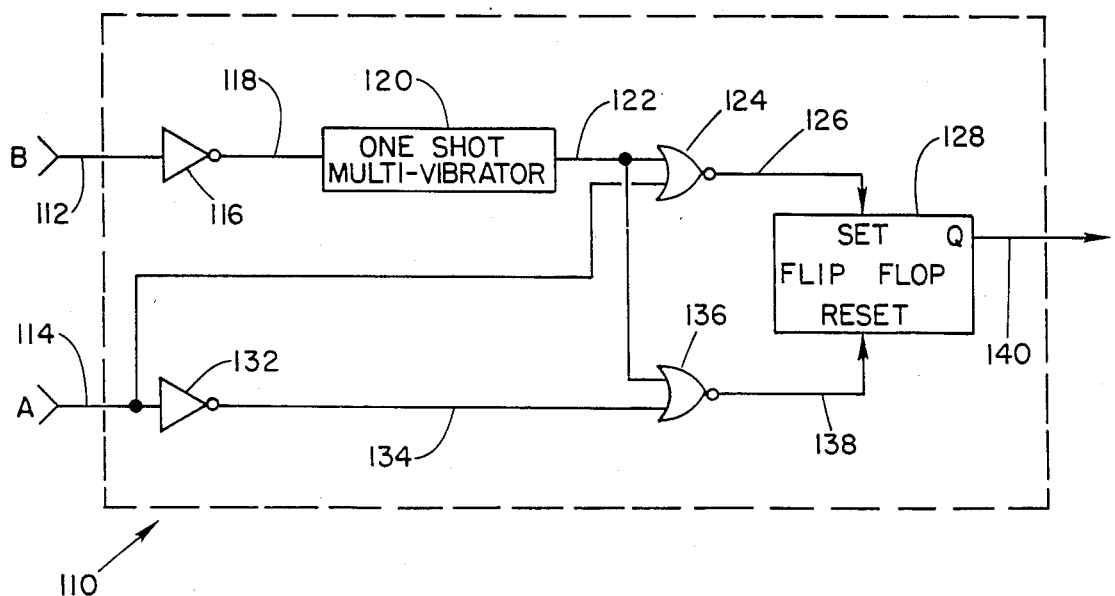
FIG. 4 is a block diagram of an integrated circuit embodiment of the present invention.

With reference now to FIG. 4, there will be seen depicted therein a digital differencing processor 110 of the present invention as actually implemented in a vehicular crash avoidance radar system. The B input pulse train 112 is delivered to a hex inverter 116, the output 118 of which in turn is delivered to one-shot multivibrator 120. The output 122 of multivibrator 120 (which may be recognized as pulse train BP of FIGS. 1D and 2D) is in turn delivered to one input of NOR gate 124. The incoming pulse train A is delivered as input 114 to the other input of NOR gate 124 and to the input of a second hex inverter 132, output 134 of which is delivered to one input of a second NOR gate 136. The second input of NOR gate 136 comprises the output 122 of the multivibrator 120. Output 126 of the first NOR gate 124 will comprise the positive logic level portions of the waveforms of FIGS. 1E and 1F. The output signal 138 will comprise the low logic level portions of the waveform of FIGS. 1E and 2E. These outputs are delivered, respectively, to the set and reset inputs of flip flop 128, the output 140 of which will, in turn, comprise the desired output of FIGS. 1F and 2F. The output 140 of flip-flop 128 may be called a difference pulse train.

Figure 5:
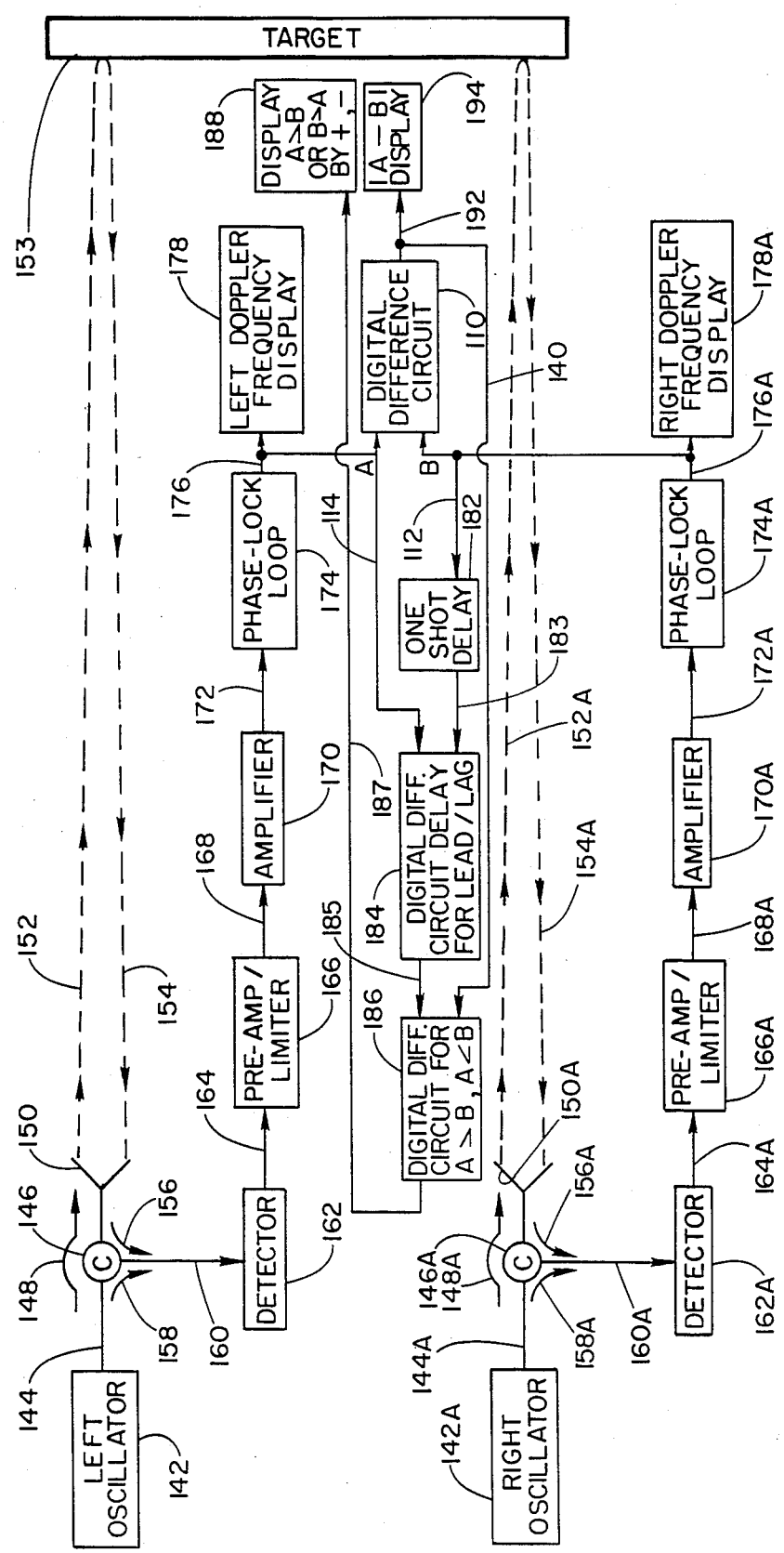
FIG. 5 is a schematic block diagram of a vehicular collision avoidance system depicting a typical application of the present invention.

With reference now to FIG. 5, there will be seen depicted therein a representative application of the digital difference processing methods and apparatus of the present invention hereinbefore described generally in the form of a vehicular collision avoidance system 141. The system 141 will preferably be mounted in a vehicle (not shown) with horn antennas 150 and 150A mounted on the vehicle and separated laterally. The beams of the antennas will be directed forward so as to imping upon a target 153. The objective of system 141 is to provide indications as to whether or not the vehicle is on a collision course with target 153. Inspection of FIG. 5 will readily reveal that the system 141 is basically comprised of symmetrical right and left channels, each with correlative components. Accordingly, for convenience, only the left channel will first be described. However, when discussing a component thereof with a particular reference number, the disclosure will apply equally as well to the correlative component of the right channel designated by an identical reference number followed by an "A". For example, in discussing the aforementioned antenna 150 of the left channel, this discussion will apply equally as well to the antenna 150A of the right channel.

With the foregoing in mind, it will be helpful to discuss in general terms operation of the system 141. System 141 basically employs two continuous wave or "CW" radar channels, each forming a familiar Doppler system well known in the art. It will be recalled that in such a system a radar beam is transmitted to a target which reflects the beam back to the system. The frequency or phase difference between the transmitted and received radar beams at the system 141 is detected, and according to well known principles will be found to be functionally related to the relative velocity between the system 141 and the target 153. The system 141 is basically comprised of two separate and independent such Doppler radar systems comprising the aforementioned left and right channels. It will be appreciated that when the antennas 150 and 150A of each channel are directed toward an oncoming target 153 centered therebetween, the indications of velocity by each channel in the aforementioned manner should be approximately equal, in which case a difference measurement between the Doppler frequencies of the right and left channels should be a minimum or zero. This, in turn, may be interpreted as an assumption that the vehicle carrying the system 141 is on a collision course with the target 153.

Conversely, should the target 153 be disposed laterally to either side from the direction in which the system 141 and vehicle is pointed, it will be expected that the detected Doppler frequency of the two channels will differ, with the magnitude of difference being indicative of and functionally related to the degree of displacement of the target 153 off the system 141 direction of travel. It will accordingly be appreciated that by providing a system such as the digital difference circuit 110 previously described of the present invention for purposes of continuously monitoring this Doppler frequency difference between the left and right channels, a direct indication may be provided of the direction of travel of the system 141 and vehicle relative to the target, e.g. whether the vehicle is on a collision course with the target 153.

With the foregoing in mind, with reference now in more detail to the components comprising the left channel of the system 141, a left channel oscillator 142, is provided which in a preferred embodiment comprises a 24.15 GHz radar frequency oscillator operating in the K band. This frequency of the output 144 of the oscillator 142 is such that the Doppler signal period is ¼ inch. The oscillator output 144 is directed to a circulator 146 of any convenient design to be hereinafter described. A portion of the microwave energy at the aforementioned frequency comprising the output 144 of oscillator 142 is passed through the circulator 146 (as shown by arrow 148) to an appropriate microwave radar antenna 150. In the embodiment herein disclosed antenna 150 is a circularly polarized horn antenna of conventional design having a half-power beam width of 12 degrees in azimuth and elevation. The antenna 150 provides the function of directing the transmitted radar beam 152 to the target 153, and receiving the reflected beam 154 returning therefrom.

The received beam, schematically indicated by arrow 156, is then received by the circulator 146. Part of the function of the circulator 146 is to develop a leakage signal schematically indicated as arrow 158, which is comprised of a portion of the output 144 of the oscillator 142. In accordance with conventional Doppler radar technique, the output 160 of the circulator 146 will be comprised of this leakage signal 158 and the return signal 156 from the target 153. The frequency of the leakage signal 158 will conventionally be that of the oscillator 142 and the transmitted beam 148 frequency. However, due to the familiar Doppler effect caused by the relative velocity between the system 141 and the target 153, the received or return beam 156 frequency will differ from that of the leakage signal 158 and transmitted signal 148 by the familiar Doppler shift frequency (which is functionally related to this relative velocity between the antenna 150 and the target 153).

The output signal 160 is delivered to a suitable microwave mixer/detector 162 which develops an output 164 correlative to the Doppler frequency difference between the frequency of the return beam 156 and the leakage signal 158. This detector output 164 is thence delivered to a preamplifier/limiter 166 whose output 168 is in turn delivered to an appropriate Doppler frequency amplifier 170. The output 172 of amplifier 170 is passed to a phase-locked loop 174 which develops an output signal 176. This output signal 176, in accordance with conventional radar practice, will vary in functional relation to the Doppler frequency or phase shift between the transmitted beam 152 and the received beam 154, and, thus, will vary as a function of the relative velocity between the antenna 150 and the target 153. This signal 176 developed by the loop 174 may then be delivered to a left Doppler frequency display 178 which will provide a visual indication of this relative velocity of the left channel.

It is important to recognize that this output signal 176 may comprise a pulse train whose frequency will vary in relation to the relative velocity of the antenna 150 and the target 153, and that this signal 176 may comprise the incoming pulse train A previously described with respect to the digital difference circuit 110 of the present invention. In like manner the correlative signal 176A developed by the right channel will have a frequency functionally related to the relative velocity between the right antenna 150A and the target 153, and may be recognized as incoming pulse train B with respect to the previous discussion of digital difference processing circuit 110.

As previously described with respect to CW Doppler radar systems, when, as in the system 141, one frequency in signal 176 indicates relative velocity between the left portion of the vehicle and target 153, and signal 176A indicates relative velocity between the right portion of the vehicle and target 153, the difference in frequency or phase shift between these signals 176 and 176A will accordingly provide information as to the position of the target 153 relative to the direction of beam pointing of the antennas 150 and 150A. If the target is approximately centered with respect to the beam pointing of the antennas, the Doppler frequencies of signals 176 and 176A may be expected to be approximately the same, in which case the output of the digital difference circuit 110 would be expected to be low at a minimum or nullity. However, if the target 153 is off-center from the direction of travel of the system 141, the transmitted and received beam pair 152-154 or 152A-154A on the side to which the target is displaced will have a lesser distance to travel per successive unit of time, i.e., a higher closing rate, between the system 141 and target 153, in which case the Doppler frequency of that channel will be higher than that of the other channel.

Accordingly, the frequency or phase difference output signal 192 from the difference circuit 110 in such case can be expected to register a greater frequency difference than the previously described situation wherein the target 153 is centered or equidistant between the directions the antennas are pointed toward. Thus this difference signal 192 out of the difference circuit 110 may be used directly as an indication of the direction of travel of the system 141 and accordingly the vehicle with respect to the target 153.

It will be recalled that the output signal 192 of the difference circuit 110 may be in the form of a pulsed wavetrain wherein each pulse thereof is indicative of 360 degrees or one cycle of frequency difference between the incoming pulse trains A and B. Moreover, it will further be recalled that by counting these pulses comprising signal 142 per unit of time, the resultant count will indicate magnitude of frequency or phase difference between the incoming signals A and B which may be displayed on any appropriate display 194. Both counting and display may be by any of a number of conventional means.

In summary then, the display 178 will indicate the velocity of the left portion of the vehicle and antenna 150 with respect to the target 153. Display 178A will indicate the velocity of the right portion of the vehicle and antenna 150A relative to the target 153. Display 194 on the other hand, will effectively indicate the difference in the closing velocities, which will, in turn, be indicative of the direction of travel of the vehicle with respect to the target.

It may be observed that although a magnitude of frequency difference between pulse trains A and B (as shown on display 144) exceeding a preselected value may indicate an off-center target, this magnitude alone will not provide information as to whether the target is off-center to the right or left. Thus, means would be desirable for providing a direction in which the target is off-centered which will now be described with further reference to FIG. 5. The components depicted in FIG. 5 for providing this function have been deleted in FIG. 4 merely for purposes of enhanced clarity in describing the functions depicted in FIG. 4.

With reference to the just-noted function of providing directional target indicators, a one shot delay circuit 182 is provided having, as its input, pulse train B depicted as reference numeral 112. The purpose of delay 182 is to provide a short pulse (preferably of a duration which is a fraction of the on time of the B pulse train) for each leading edge of each pulse of the wavetrain B (such as that depicted in FIG. 2B). Moreover, these pulses from the delay circuit 182 will be generated delayed slightly from the leading edge of the B pulses. Thus, the pulse output train 183 will be delivered on the output of the delay 182 similar in form to the BP pulse train depicted in FIG. 2D but delayed slightly by the delay provided by delay circuit 182. Such delay may also preferably be for a fraction of the duty cycle of the B pulse train. This delayed BP pulse train 183 will then be delivered to an appropriate digital difference circuit 184. The A pulse train such as that depicted in FIG. 2A and occuring at reference numeral 114 in FIG. 5 will also be delivered to the delay circuit 184.

Still refering to FIG. 5, the purpose of the circuit 184 is to provide an output 185 which remains in a high or logic 1 state during coincidence of each delayed BP pulse on the delayed BP pulse output 183 with a correlative A pulse on the reference numeral 114 line delivered to the difference circuit 184. Thus, circuit 184 output 185 will, in like manner, remain in the low state during the time in which delayed BP pulses on the delayed BP pulse output 183 are non-coincident with A pulses on the A pulse line 112. The output 185 of circuit 184 may be called a difference pulse train.

A digital difference circuit 186 is further provided, having as its inputs the aforementioned output 185 from the delay circuit 184 and further having as its input the pulse train carried on the line designated by reference numeral 140. It will be recalled from the previous disclosure that the pulse train on this line 140 may preferably take the form of that depicted in FIG. 2F wherein it will remain in a logic 1 state during simultaneous occurence of BP pulses and A pulses, and will remain in a logic 0 state during occurence of BP pulses and absence of A pulses.

The circuits 182 and 184 may be implemented in any of a number of manners well known in the art. Thus, for example, the circuit 182 may take the form of a digital delay line and a one shot multivibrator. The circuit 184 may, in like manner, include a familiar set-reset flip flop which is set by the coincidence of the output of the one shot of delay circuit 182 and the A pulses of 114 (which may be conveniently formed by a familiar "AND" digital function). The reset of the flip flop of delay circuit 184 will be triggered by the ANDing of the delayed BP pulses from the one shot of circuit 182 with the complement of the A wavetrain (i.e. non-coincidence of A pulses and delayed BP pulses).

Referring to the difference circuit 186 in greater detail, the purpose of this circuit is to detect coincidence and non-coincidence of the leading edge of the pulse train 185 with the pulse train on the other input to the difference circuit 186, i.e. the pulse train on reference line 140. Thus, the difference circuit 186 will, in one embodiment, include a leading edge triggered one shot multivibrator for providing a short duration pulse during the leading edge of every pulse occuring on the output 185.

The circuit 186 will further conveniently provide an ANDing circuit for ANDing these leading edge pulses with the high states of pulses on the reference line 140, whereby a logic 1 level is obtained each time there is coincidence of these leading edge triggered one shot pulses and a high state on the reference line 140. In turn, these logic level 1 outputs from the aforementioned ANDing function may be used as the set input of a conventional set-reset flip flop. In this manner the output 187 of the difference circuit 186, corresponding to the output of the set-reset flip flop contained in the difference circuit 186 will remain in a set or logic 1 high state so long as there is coincidence of the leading edge pulses generated by the leading edges of the pulse train on output 185 with the high state of pulses on the reference line 140. This high or logic 1 level state of output 187 will correspond to the physical situation in which the frequency of the A pulse train is less than that of the B pulse train.

In like manner, non-coincidence of leading edge one shot pulses generated from the leading edge of pulses on the wavetrain of output 185 with the high state of pulses on the reference line 140 may be used to reset the set-reset flip flop which may be included in the difference circuit 186. In this manner, when the leading edge of pulses on the output 185 (corresponding to delayed BP pulses coincident with A pulses) is not coincident with the high state of pulses on the reference line 140 (such high state on reference line 140 corresponding to coincidence of BP pulses and A pulses), this output 187 from the difference circuit 186 will remain in a low state, inasmuch as the set-reset flip flop contained in difference circuit 186 is continuously being reset. This low state of the output 187 physically corresponds to frequency of the A pulse train being greater than that of the B pulse train.

In FIG. 5, it will be noted that this output 187 may preferably be routed to a directional display 188 of any convenient form wherein a high state on the output 187 will provide one indication and a low state on output 187 will provide an alternate indication in the display 188. In one embodiment, this high state output 187 may, if desired, activate a visual "+" indicator or alphanumeric display of the term "RIGHT" whereas a low state of output 187, in the alternative, would illuminate a "−" sign or "LEFT" alphanumeric display. Such + or RIGHT indicators would indicate the target was skewed to the right relative to the longitudinal axis separating the beams 152 and 154. Conversely, a − or LEFT indication would indicate skewing of the target to the right of the axis.

Due to changes in velocity and distance between the oncoming vehicle and target 153, it is desirable to update the displays 194, 178 and 178A periodically to provide relatively current information to the vehicle operator. Accordingly, conventional circuitry may be provided for periodically latching and resetting the counts displayed in displays 178, 178A, and 194, as desired in a conventional manner.

The left and right channels for effecting the Doppler frequency output signals 176 and 176A may, in one embodiment, take the form of a continuous wave police Doppler radar for detecting vehicle speeds which is commercially available, a representative example of which may be a model HR-4 police radar manufactured by the Kustom Electronics Company of Chanute, Kans. Similarly, the displays 178, 178A, and 194 may be effected with a number of commercially available frequency counter/displays, a representative example of which may be seen in the Super Cub LCD Display manufactured by the Red Lion Controls Company, which has been found to be quite suitable in the embodiment of the present invention herein described.

Although a system has been herein disclosed for detecting horizontal positioning of a target, the invention is not intended to be so limited. In an alternate embodiment, it may also be desirable to provide, for example, indications of the vertical positioning of the target. Accordingly, as desired, in addition to the horizontally oriented system just described, a similar system may be provided wherein two radar beams such as 152 and 152A of the system herein described are positioned vertically with respect to one another and incident upon the target. Similarly, the two correlative return beams 154 and 154A, which will also be in vertically spaced relation, will be detected and processed in a manner comporting with the herein described horizontal system.

It is to be noted that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape, and material composition of its components, as well as in the details of the illustrated construction, without departing from the scope and spirit thereof.

What is claimed is:

1. Apparatus for measuring the difference in frequency and phase between first and second pulse trains, comprising:
   (a) first difference circuit means comprising (b), (c), (d), and (e) as follows:

(b) leading edge detection means for detecting the leading edges of pulses comprising said second pulse train;

(c) coincidence detection means for detecting coincidence and non-coincidence of each of said leading edges with pulses comprising said first pulse train;

(d) memory element means;

(e) set/reset means for setting said memory element means to a first state in response to each said coincidence of said leading edge and one of said pulses comprising said first pulse train, and for re-setting said memory element to a second state in response to each said non-coincidence of said leading edge and one of said pulses comprising said first pulse train, output of said memory means forming a first difference pulse train;

(f) pulse delay means for detecting leading edges of said second pulse train and for generating a corresponding delayed pulse for each said leading edge;

(g) second difference circuit means for detecting coincidence and non-coincidence of each of said delayed pulses with pulses comprising said first pulse train, said coincidences and non-coincidences forming a second difference pulse train;

(h) third difference circuit means for detecting coincidence and non-coincidence of leading edges of said second difference pulse train and said first states of said first difference pulse train, said third difference circuit means producing a third difference pulse train providing a measure of the difference between said first and said second pulse trains.

2. Apparatus of claim 1 wherein said coincidences of said third difference circuit correspond to the physical situation where frequency of said first pulse train is greater than the frequency of said second pulse train and wherein, said non-coincidences of said third difference circuit correspond to the physical situation where frequency of said second pulse train is greater than the frequency of said first pulse train.

3. Apparatus of claim 1 wherein said first pulse train is the doppler difference between a first transmitted signal and a received return portion of said first transmitted signal, and wherein, said second pulse train is the doppler difference between a second transmitted signal and a received return portion of said second transmitted signal.

4. A method for measuring the difference in frequency or phase between first and second pulse trains, comprising (a) forming a first difference pulse by steps (b), (c), (d), and (e) as follows:

(b) detecting the leading edges of pulses comprising said second pulse train, (c) detecting coincidence and non-coincidence of each of said leading edges with pulses comprising said first pulse train, (d) setting a memory element to a first state in response to each said coincidence of said leading edge and one of said pulses comprising said first pulse train, (e) resetting said memory element to a second state in response to each said non-coincidence of said leading edge and one of said pulses comprising said first pulse train, output of said memory element comprising a first difference pulse train, (f) detecting the leading edges of said second pulse train and generating a corresponding delayed pulse for each said leading edge, (g) forming a second difference pulse train by detecting coincidence and non-coincidence of each of said delayed pulses with pulses comprising said first pulse train, said coincidences and non-coincidences forming a second difference pulse train, (h) forming a third difference pulse train by detecting coincidence and non-coincidence of leading edges of said second difference pulse train and said first states of said first difference pulse train, wherein said third difference pulse train is a measure of the difference between said first and said second pulse trains.

5. The method of claim 4 comprising the further step of indicating frequency of said first pulse train greater than frequency of said second pulse train by indicating coincidences of said third difference pulse train.

6. The method of claim 4 comprising the further step of indicating frequency of said second pulse train greater than frequency of said first pulse train by indicating non-coincidences of said third difference pulse train.

7. The method of claim 4 wherein said first pulse train is derived by forming a doppler difference between a first transmitted signal and a received return portion of said first transmitted signal, and wherein said second pulse train is derived by forming a doppler difference between a second transmitted signal and a received return portion of said second transmitted signal.

8. Apparatus for detecting if a vehicle is on a collision course with a target, comprising:

(a) first radar means for transmitting a first radar beam from a first point on said vehicle toward said target and for receiving at said first point a portion of the beam reflected from said target;

(b) second radar means for simultaneously transmitting from a second point to said vehicle a second radar beam and for receiving at said second point a portion of said second beam reflected from said target, said second point being spaced from said first point in a direction transverse to direction of vehicle travel;

(c) first pulse generator means for deriving a first pulse train form a comparison of said first radar beam and said portion of said reflected first beam, said first pulse train having a frequency proportional to the relative velocity between said target and said first point;

(d) second pulse generator means for deriving a second pulse train from a comparison of said second beam and said portion of said reflected second beam, said second pulse train having a frequency proportional to the relative velocity between said target and said second point;

(e) difference circuit means for determining the frequency or phase difference between said first and said second pulse trains, said difference indicating a collision course of the vehicle and the target when said difference is zero or of relatively small magnitude, wherein said difference circuit further comprises:

(f) leading edge detection means for detecting the leading edges of pulses comprising said second pulse train;

(g) coincidence detection means for detecting coincidence and non-coincidence of each of said leading edges with pulses comprising said first pulse train;

(h) memory element means;

(i) set/reset means for setting said memory element means to a first state in response to each said coincidence of said leading edge and one of said pulses comprising said first pulse train, and for re-setting said memory element to a second state in response to each said non-coincidence of said leading edge and one of said pulses comprising said first pulse train;

(j) counting means for deriving a count of the number of first states of said memory element as a function of time; and (k) indicator means for indicating said count as an indication of said frequency or phase difference between said first and said second pulse trains.

9. Apparatus for detecting to which side of a vehicle a target is passing, comprising:

(a) first radar means for transmitting a first radar beam from a first point on said vehicle toward said target and for receiving at said first point a portion of the beam reflected from said target;

(b) second radar means for simultaneously transmitting from a second point on said vehicle a second radar beam and for receiving at said second point a portion of said second beam relfected from said target, said second point being spaced from said first point in a direction transverse to direction of vehicle travel;

(c) first pulse generator means for deriving a first pulse train from a comparison of said first radar beam and said portion of said reflected first beam, said first pulse train having a frequency proportional to the relative velocity between said target and said first point;

(d) second pulse generator means for deriving a second pulse train from a comparison of said second beam and said portion of said reflected second beam, said second pulse train having a frequency proportional to the relative velocity between said target and said second point;

(e) first difference circuit means comprising (f), (g), (h), and (i) as follows:

(f) leading edge detection means for detecting the leading edges of pulses comprising said second pulse train;

(g) coincidence detection means for detecting coincidence and non-coincidence of each of said leading edges with pulses comprising said first pulse train;

(h) memory element means;

(i) set/reset means for setting said memory element means to a first state in response to each said coincidence of said leading edge and one of said pulses comprising said first pulse train, and for re-setting said memory element to a second state in response to each said non-coincidence of said leading edge and one of said pulses comprising said first pulse train, output of said memory means forming a first difference pulse train;

(j) pulse delay means for detecting leading edges of said second pulse train and for generating a corresponding delayed pulse for each said leading edge;

(k) second difference circuit means for detecting coincidence and non-coincidence of each of said delayed pulses with pulses comprising said first pulse train, said coincidences and non-coincidences forming a second difference pulse train;

(l) third difference circuit means for detecting coincidence and non-coincidence of leading edges of said second difference pulse train and said first states of said first difference pulse train; wherein said coincidences of said third difference circuit correspond to the physical situation where frequency of said first pulse train is greater than the frequency of said second pulse train and target is passing to the side of vehicle nearest said first point, and said non-coincidences of said third difference circuit correspond to the physical situation where frequency of said second pulse train is greater than the frequency of said first pulse train and target is passing to the side of vehicle nearest said second point.

10. Apparatus of claim 9 for also indicting to which side of a vehicle a target is passing, further comprising directional display means for indicating said coincidences and non-coincidences of said third difference circuit, and thus, to which side of said vehicle said target is passing.

* * * * *